(12) United States Patent
Morimoto et al.

(10) Patent No.: US 10,197,709 B2
(45) Date of Patent: Feb. 5, 2019

(54) OPTICAL FILM LAMINATE USED FOR CONTINUOUS LAMINATION TO PANEL COMPONENT

(71) Applicant: NITTO DENKO CORPORATION, Ibaraki-shi, Osaka (JP)

(72) Inventors: Yu Morimoto, Ibaraki (JP); Yusuke Toyama, Ibaraki (JP); Takaaki Ishii, Ibaraki (JP); Kazuo Kitada, Ibaraki (JP); Satoshi Hashimoto, Ibaraki (JP); Akihiro Nagura, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/557,688

(22) PCT Filed: Nov. 4, 2015

(86) PCT No.: PCT/JP2015/080979
§ 371 (c)(1),
(2) Date: Sep. 12, 2017

(87) PCT Pub. No.: WO2016/151922
PCT Pub. Date: Sep. 29, 2016

(65) Prior Publication Data
US 2018/0052256 A1    Feb. 22, 2018

(30) Foreign Application Priority Data

Mar. 24, 2015 (JP) ................................. 2015-060266

(51) Int. Cl.
*G02B 1/16* (2015.01)
*B32B 27/00* (2006.01)
(Continued)

(52) U.S. Cl.
CPC .................. *G02B 1/16* (2015.01); *B32B 7/02* (2013.01); *B32B 27/00* (2013.01); *C08J 7/045* (2013.01);
(Continued)

(58) Field of Classification Search
CPC ............. G02F 1/133528; G02F 1/1303; G02F 1/1333; G02F 2202/22; G02F 1/28;
(Continued)

(56) References Cited

U.S. PATENT DOCUMENTS

2008/0044674 A1*  2/2008  Inoue ...................... B32B 27/00
                                                               428/480
2008/0243002 A1*  10/2008 Munce ................. A61B 5/0062
                                                               600/459
(Continued)

FOREIGN PATENT DOCUMENTS

CN       101040198 A       9/2007
CN       201654739 U       11/2010
(Continued)

OTHER PUBLICATIONS

International Preliminary Report on Patentability with Written Opinion of the International Searching Authority dated Sep. 26, 2017 corresponding to International Application No. PCT/JP2015/080979.
(Continued)

*Primary Examiner* — Sophie Hon
(74) *Attorney, Agent, or Firm* — Hauptman Ham, LLP

(57) ABSTRACT

To provide a continuous web of optical film laminate provided with static electrification prevention function which allows for promptly attenuating static charge of optical film sheet and carrier film electrified by peeling action in RTP lamination method and apparatus. The problem has been solved with a continuous web of optical film laminate for
(Continued)

using in RTP lamination method and apparatus, in which static electrification prevention function is provided to optical film sheets and a carrier film configuring the continuous web of optical film laminate, such that sheet resistance of each of the optical film sheets and the carrier film is $10^{12}$ Ω/sq or less so as to promptly attenuate static charge of the carrier film to be collected, which is statically electrified by peeling action, and the optical film sheets to be laminated to panel components, which are also statically electrified by peeling action.

24 Claims, 7 Drawing Sheets

(51) Int. Cl.
  G02F 1/1335 (2006.01)
  B32B 7/02 (2006.01)
  C08J 7/04 (2006.01)
  G02B 5/30 (2006.01)
  G02B 1/14 (2015.01)
  B32B 7/12 (2006.01)
  G02F 1/13 (2006.01)
(52) U.S. Cl.
  CPC ............... *G02B 1/14* (2015.01); *G02B 5/305* (2013.01); *G02B 5/3033* (2013.01); *G02F 1/1335* (2013.01); *G02F 1/133528* (2013.01); *B32B 7/12* (2013.01); *B32B 2307/40* (2013.01); *B32B 2457/202* (2013.01); *G02F 1/1303* (2013.01); *G02F 2202/22* (2013.01); *G02F 2202/28* (2013.01); *Y10T 428/1055* (2015.01)
(58) Field of Classification Search
  CPC . B32B 2307/40; B32B 2457/202; B32B 7/06; Y10T 428/14; Y10T 428/1055; G02B 1/16
  USPC .................................................. 264/1.6–1.7
  See application file for complete search history.

(56) References Cited

U.S. PATENT DOCUMENTS

| | | | |
|---|---|---|---|
| 2010/0028564 A1* | 2/2010 | Cheng | G02B 5/3025 428/1.1 |
| 2011/0315297 A1 | 12/2011 | Koshio et al. | |
| 2012/0056340 A1* | 3/2012 | Kitagawa | B32B 41/00 264/1.34 |
| 2013/0126080 A1 | 5/2013 | Hirata et al. | |

FOREIGN PATENT DOCUMENTS

| | | |
|---|---|---|
| CN | 101925846 A | 12/2010 |
| CN | 102582174 A | 7/2012 |
| CN | 103589353 A | 2/2014 |
| JP | H4-124601 A | 4/1992 |
| JP | 2001-318230 A | 11/2001 |
| JP | 2004-338379 A | 12/2004 |
| JP | 2005-153250 A | 6/2005 |
| JP | 2005153250 A * | 6/2005 |
| JP | 2007-45953 A | 2/2007 |
| JP | 2009-157363 A | 7/2009 |
| JP | 2009-229956 A | 10/2009 |
| JP | 4701750 B2 | 6/2011 |
| JP | 2012-27003 A | 2/2012 |
| JP | 2012-53288 A | 3/2012 |
| JP | 2012-58433 A | 3/2012 |
| JP | 2012-93664 A | 5/2012 |
| JP | 2012-224041 A | 11/2012 |
| JP | 2014-32360 A | 2/2014 |
| JP | 2014-113741 A | 6/2014 |
| JP | 2014-151573 A | 8/2014 |
| KR | 10-2009-0125402 A | 12/2009 |
| KR | 10-1057307 B1 | 8/2011 |
| TW | 200949314 A | 12/2009 |

OTHER PUBLICATIONS

Office Action dated Dec. 11, 2015, from JPO in connection with the counterpart Japanese Patent Application No. 2015-060266.
Office Action dated Feb. 9, 2017, from TIPO in connection with the counterpart Taiwan Patent Application No. 105104754, citing the above reference(s).
Office Action dated Oct. 12, 2017, from KIPO in connection with the counterpart Korean Patent Application No. 10-2017-7015082 with a partial English translation, citing the above reference(s).
International Search Report dated Dec. 28, 2015 for PCT/JP2015/080979, citing the above reference(s).
Japanese Office Action dated Dec. 15, 2015 for Japanese Patent Application No. 2015-060266, citing the above reference(s).
Chinese Office Action dated Feb. 27, 2018 for corresponding Chinese Application No. 201580071449.X, with English Translation.
Chinese Office Action dated Sep. 18, 2018 for corresponding Chinese Application No. 201580071449.X, with English Translation.

* cited by examiner

FIG. 4
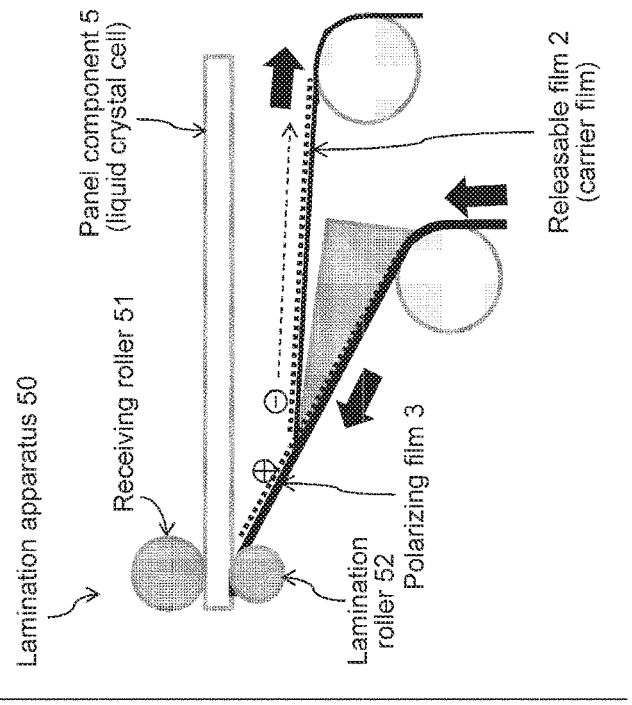
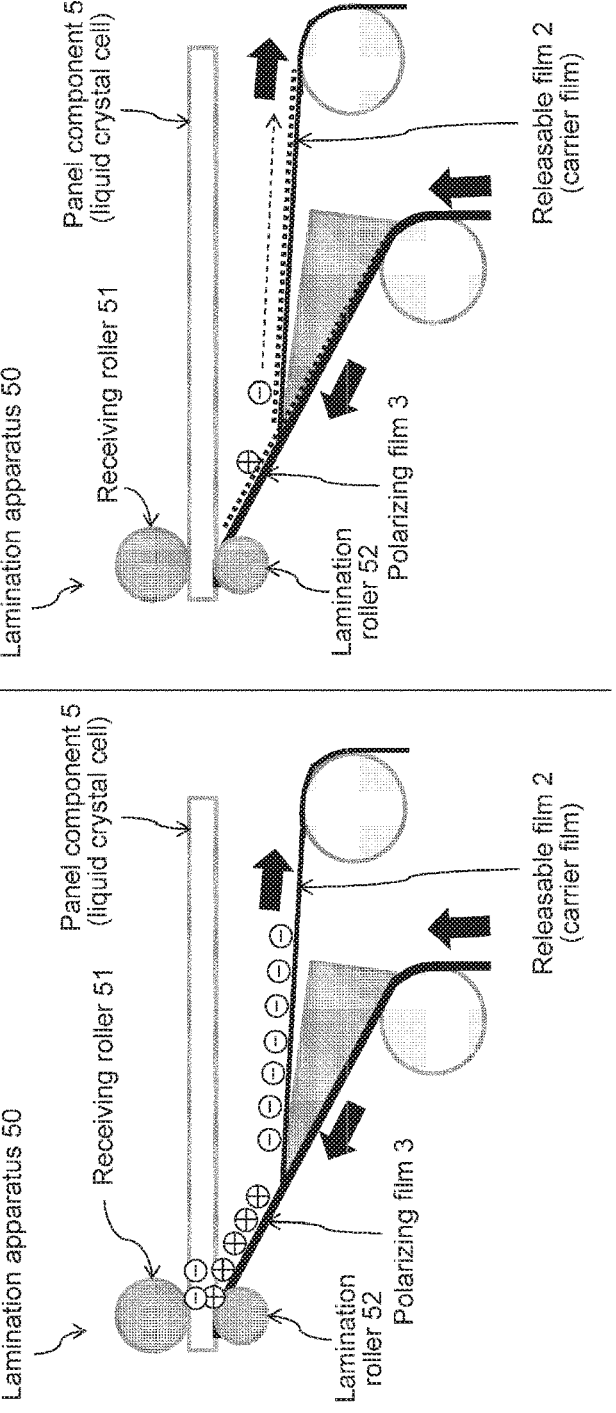

FIG.6

| | Optical film side | | Releasable film side | | Effect |
|---|---|---|---|---|---|
| | Conductive function given layer | Sheet resistance ($\Omega$/sq) | Conductive function given layer | Sheet resistance ($\Omega$/sq) | |
| Example 1 | Between polarizing film and adhesive layer | $10^{12}$ | Inner side of releasable film | $10^{12}$ | ○ |
| Example 2 | Between polarizing film and adhesive layer | $10^{8}$ | Inner side of releasable film | $10^{12}$ | ○ |
| Example 3 | Between polarizing film and adhesive layer | $10^{12}$ | Inner side of releasable film | $10^{8}$ | ○ |
| Example 4 | Adhesive layer | $10^{8}$ | Inner side of releasable film | $10^{8}$ | ○ |
| Example 5 | Adhesive layer | $10^{12}$ | Inner side of releasable film | $10^{12}$ | ○ |
| Comparative example 1 | None | Not measurable | None | Not measurable | × |
| Comparative example 2 | Between polarizing film and adhesive layer | $10^{12}$ | None | Not measurable | × |
| Comparative example 3 | Adhesive layer | $10^{8}$ | None | Not measurable | × |
| Comparative example 4 | None | Not measurable | Inner side of releasable film | $10^{8}$ | × |
| Comparative example 5 | Between polarizing film and adhesive layer | $10^{12}$ | Outer side of releasable film | $10^{8}$ | × |

OPTICAL FILM LAMINATE USED FOR CONTINUOUS LAMINATION TO PANEL COMPONENT

CROSS REFERENCE TO RELATED APPLICATION

This application claims the priority of Japanese Patent Application No. 2015-060266, filed on Mar. 24, 2015 in the Japanese Patent Office. Further, this application is the National Phase application of International Application No. PCT/JP2015/080979 filed on Nov. 4, 2015, which is incorporated herein by reference in its entirety.

TECHNICAL FIELD

The present invention relates to a continuous web of optical film laminate to be used in a method and an apparatus for continuously manufacturing optical display devices by laminating optical film sheets to panel components (hereinafter referred as "RTP lamination method and apparatus").

More in particular, in RTP lamination method and apparatus for continuously manufacturing optical display devices by laminating optical film sheets via adhesive layer to panel components conveyed to a predetermined lamination position, when a carrier film which is laminated to an adhesive layer and configures a continuous web of optical film laminate is peeled from the adhesive layer, the peeled carrier film is statically electrified by peeling, which in turn causes inductive electrification on the panel components being conveyed to the predetermined lamination position. On the other hand, a surface of the adhesive layer peeled from the carrier film is also statically electrified by peeling, and when the optical film sheets including the electrified adhesive layer is conveyed to the predetermined lamination position and laminated to the panel components, it also causes inductive electrification on the panel components.

The present invention relates to a continuous web of optical film laminate given with electrification-preventing function for promptly attenuating static charge of the optical film sheets including the statically electrified carrier film and adhesive layer, in order to solve new technical problem found in RTP lamination method and apparatus.

BACKGROUND ART

It has been well known that static electricity of electrified optical display device can deteriorate or can even damage built-in electronic components. For example, electronic components built in a liquid crystal panel include field effect transistors such as TFT elements. In order to prevent electrostatic discharge damage of such electronic components, manufacturing of liquid crystal display devices is normally completed after processes described in the following.

In general, a liquid crystal panel has a structure where a liquid crystal layer is encapsulated between a color filer layer (CF substrate) and a transparent electrode layer (TFT substrate). A liquid crystal display device is finished at least after a process of laminating rectangularly-shaped polarizing film sheets to both surfaces of a liquid crystal panel. At this process, in RTP lamination method and apparatus which is different from conventional sheet lamination (sheet-type lamination) method and apparatus, when a polarizing film sheet is peeled from a carrier film, static electrification is caused in the carrier film, and on the other hand, the polarizing film sheet including an adhesive layer which is simultaneously statically electrified by peeling is laminated to a liquid crystal panel while peeling off from the carrier film.

Conventional lamination method and apparatus, in general, comprises steps of preparing many optical film sheets and accumulating them in a magazine, feeding an optical film sheet one by one, peeling a releasable film sheet from a polarizing film sheet having an adhesive layer with the releasable film sheet, and positioning and laminating a separately-conveyed liquid crystal panel to the exposed adhesive layer of the polarizing film sheet, and since a liquid crystal panel is laminated at a predetermined lamination position to a polarizing film sheet which is previously peeled and the peeled releasable film sheet is processed without approaching to the predetermined lamination position, the releasable film sheet does not affect to the liquid crystal panel to be laminated to a polarizing film sheet even if it is statically electrified by peeling.

Thus, a remaining problem is how to attenuate static charge of a polarizing film sheet including an adhesive layer statically electrified by peeling, before laminating to a liquid crystal panel. Various attempts have been made to address the problem.

RTP lamination method and apparatus comprise a process of peeling a polarizing film sheet including an adhesive layer from a carrier film and simultaneously laminating the polarizing film sheet including the adhesive layer to a liquid crystal panel. More in particular, in RTP lamination method and apparatus, since a liquid crystal panel is conveyed to a predetermined lamination position in close vicinity of a peeled carrier film where a polarizing film sheet including an adhesive layer is laminated to the liquid crystal panel while being peeled from the carrier film, it is not possible to avoid effect of the carrier film and the polarizing film sheet that are statically electrified by peeling. Inductive electrification of a liquid crystal panel due to static electrification caused by peeling was not considered in conventional lamination method and apparatus and is clarified as a new technical problem to be solved only in RTP lamination method and apparatus.

That is, at least two problems need to be solved to prevent static electrification of a liquid crystal panel in RTP lamination method and apparatus. A first problem is to prevent inductive electrification of a liquid crystal panel induced by a carrier film, being conveyed in close vicinity of the carrier film which is statically electrified by peeling. A second problem is how to address inductive electrification of the liquid crystal panel caused when laminating thereto a polarizing film sheet including an adhesive layer which is statically electrified while peeling from the carrier film. If it is addressed incompletely, electronic components built-in an inductively-electrified liquid crystal panel may be damaged by static electricity, or even if not damaged, light leaking parts due to orientation disorder of liquid crystal may be found in an inspection process in a completed liquid crystal display device, as seen in a photograph in FIG. 2. As a result, a transmission inspection of a liquid crystal display device as a product becomes difficult which in turn compromises continuous manufacturing of a liquid crystal display device.

Various proposals have been made for conventional technical problems. For example, Patent Document 1 describes an optical film laminate which can restrict affect of static electricity caused by peeling. More in particular, a conductive layer is provided on a surface for forming an adhesive layer of an optical film configuring an optical film laminate. Patent Document 2 also describes as that an inductive adhesive layer is formed on an optical film laminate. Further, Patent Document 3 describes as that inductivity is provided to a continuous web of optical film to be used for example in a surface protection film sheet for protecting a polarizing film sheet used, after being laminated to a liquid crystal panel configuring an optical film laminate, in a manufacturing process of an optical display device. Patent Document 4 describes as that static electrification of an optical film laminate caused by peeling from a releasable film is controlled by intervening a conductive layer formed with sheet resistance of $10^2$ Ω/sq or higher and $10^6$ Ω/sq or less in the optical film laminate.

Patent Document 5 describes a lamination method and an apparatus for continuously manufacturing optical display devices by restricting static electricity caused by peeling in optical film sheets to be laminated to panel components. More in detail, Patent Document 5 relates to a lamination method and an apparatus for continuously manufacturing optical display devices with a continuous web of optical film laminate configured with a base film which corresponds to a carrier film and a functional film which corresponds to an optical film, including that functional film sheets are formed from a functional film, the functional film sheets are peeled with a peeling means from a base film i.e. a carrier film of the continuous web of optical film laminate, and the functional film sheets are laminated to the panel components.

Patent Document 5 further describes a lamination method and an apparatus in which a peeling means is configured with a material positioned on further negative side (or further positive side) in triboelectric series than a carrier film when a continuous web of carrier film is negatively (or positively) charged by peeling, so that static electricity generated in functional film sheets when peeling from the continuous web of carrier film does not electrically damage electrical components built in panel components when manufacturing optical display devices by laminating the functional film sheets to the panel components. Patent Document 5 describes as that static electric charge generated in a carrier film is controlled and thereby electric charge in functional film sheets is restricted by selecting a material of a peeling means according to a state of static electrification, i.e. degree of negative (or positive) charge, of the carrier film caused by peeling, which is, in short, that electric charge of the functional film sheets to be directly laminated to the panel components is restricted.

PRIOR ART DOCUMENTS

Patent Document 1: Japanese Laid-Open Patent Application No. 2001-318230A
Patent Document 2: Japanese Laid-Open Patent Application No. 2014-032360A
Patent Document 3: Japanese Patent No. 4701750B
Patent Document 4: Japanese Laid-Open Patent Application No. 2009-157363A
Patent Document 5: Japanese Laid-Open Patent Application No. 2012-224041A
Patent Document 6: Japanese Laid-Open Patent Application No. 2004-338379A
Patent Document 7: Japanese Laid-Open Patent Application No. 2014-113741A

DISCLOSURE OF THE INVENTION

Problem to be Solved by the Invention

An aim of the present invention is to provide a continuous web of optical film laminate which may promptly attenuate static electrification caused by peeling in both of the optical film laminate and a releasable film in RTP lamination method and apparatus for continuously manufacturing optical display devices by laminating optical film sheets to panel components.

More in particular, in a continuous web of optical film laminate, static electrification prevention function is provided to a carrier film for avoiding static charge of the carrier film influencing to panel components, and static electrification prevention function is also provided to optical film sheets to be laminated to the panel components, so that electric charge generated by peeling may be promptly attenuated before laminating the statically electrified optical film sheets to the panel components. The continuous web of optical film laminate may be used in RTP lamination method and apparatus as a continuous web of optical film laminate having static electrification prevention function with sheet resistance of at least $10^{12}$ Ω/sq or less.

Means for Solving the Problem

The problem may be solved by a continuous web of optical film laminate for using in RTP lamination method and apparatus, comprising a continuous web of optical film with an adhesive layer formed on one surface thereof to be laminated at least to panel components and a continuous web of releasable film with a releasably treated layer formed on a surface thereof contacting with the adhesive layer, in which, the optical film is provided with static electrification prevention function on the adhesive layer side while the releasable film is provided with static electrification prevention function on each of sides to be peeled when laminated to panel components such that static electrification prevention function is provided to the releasably treated layer side.

A first aspect of the present invention is a continuous web of optical film laminate for using in continuous lamination to panel components, comprising a continuous web of optical film with an adhesive layer formed on one surface thereof to be laminated at least to the panel components and a continuous web of releasable film with a releasably treated layer formed on a surface contacting with the adhesive layer, in which a continuous web of first conductive layer is intervened between the optical film and the adhesive layer and a continuous web of second conductive layer is intervened between the releasable film and the releasably treated layer.

In the first aspect of the present invention, the first conductive layer and the second conductive layer are formed with a material which provides static electrification prevention function such that sheet resistance of both the optical film with the first conductive layer intervened between the optical film and the adhesive layer and the releasable film with the second conductive layer intervened between the releasable film and the releasably treated layer may be at least $10^{12}$ Ω/sq or less. The material which provides static electrification prevention function is preferably one of ionic surface-active agent including cationic or anionic agent, conductive polymer, or metal oxide including tin oxide or antimony oxide.

A second aspect of the present invention is a continuous web of optical film laminate for using in continuous lamination to panel components, comprising a continuous web of optical film with an adhesive layer formed on one surface thereof to be laminated at least to the panel components and a continuous web of releasable film with a releasably treated layer formed on a surface contacting with the adhesive layer, in which the optical film is intervened with a continuous web of conductive layer between the adhesive layer, and the releasable film is provided with conductive function.

In the second aspect of the present invention, the releasable film is preferably formed such that sheet resistance thereof is at least $10^{12}$ Ω/sq or less by kneading a material which provides static electrification prevention function into polyethylene terephthalate (PET) resin. Further, the material which provides static electrification prevention function is preferably one of ionic surface-active agent including cationic or anionic agent, conductive polymer, or metal oxide including tin oxide or antimony oxide.

Further, a conductive layer formed on one of surfaces of an optical film may be formed such that sheet resistance of the optical film with the conductive layer intervening between the optical film and the adhesive layer is at least $10^{12}$ Ω/sq or less by using a material which provides static electrification prevention function, and, the material which provides static electrification prevention function is preferably one of ionic surface-active agent including cationic or anionic agent, conductive polymer, or metal oxide including tin oxide or antimony oxide.

A third aspect of the present invention is a continuous web of optical film laminate for using in continuous lamination to panel components, comprising a continuous web of optical film with a conductive adhesive layer formed on one surface thereof to be laminated at least to the panel components and a continuous web of releasable film with a releasably treated layer formed on a surface contacting with the conductive adhesive layer, in which the releasable film is intervened with a conductive layer between the releasably treated layer.

In the third aspect of the present invention, the conductive adhesive layer formed on one of surfaces of an optical film is preferably formed such that sheet resistance of the optical film including the conductive adhesive layer is at least $10^{12}$ Ω/sq or less by kneading a material which provides static electrification prevention function into acrylic adhesive layer, and the material which provides static electrification prevention function is preferably one of ionic surface-active agent including cationic or anionic agent, conductive polymer, or metal oxide including tin oxide or antimony oxide.

Further, a conductive layer configuring the releasable film may be formed with a material which provides static electrification prevention function such that sheet resistance of the releasable film with the conductive layer intervening between the releasably treated layer is at least $10^{12}$ Ω/sq or less, and the material which provides static electrification prevention function is preferably one of ionic surface-active agent including cationic or anionic agent, conductive polymer, or metal oxide including tin oxide or antimony oxide.

A fourth aspect of the present invention is a continuous web of optical film laminate for using in continuous lamination to panel components, comprising a continuous web of optical film with a conductive adhesive layer formed on one surface thereof to be laminated at least to the panel components and a continuous web of releasable film with a releasably treated layer formed on a surface contacting with the conductive adhesive layer, in which the releasable film is provided with conductive function.

In the fourth aspect of the present invention, the conductive adhesive layer formed on one of surfaces of an optical film is preferably formed such that sheet resistance of the optical film including the conductive adhesive layer is at least $10^{12}$ Ω/sq or less by kneading a material which provides static electrification prevention function into acrylic adhesive layer, and the material which provides static electrification prevention function is preferably one of ionic surface-active agent including cationic or anionic agent, conductive polymer, or metal oxide including tin oxide or antimony oxide.

In the fourth aspect of the present invention, the releasable film configuring a continuous web of optical film laminate may be formed such that sheet resistance thereof is at least $10^{12}$ Ω/sq or less by kneading a material which provides static electrification prevention function into polyethylene terephthalate (PET) resin, and the material which provides static electrification prevention function is preferably one of ionic surface-active agent including cationic or anionic agent, conductive polymer, or metal oxide including tin oxide or antimony oxide.

In the first to the fourth aspect of the present invention, the continuous web of optical film laminate may be wound as a roll. Also, a wound roll may be slit to a width corresponding to a long side or a short side of a panel component to be used in RTP lamination apparatus, and may be wound again to form feeding rolls for the RTP lamination apparatus.

BRIEF DESCRIPTION OF THE DRAWINGS

FIG. 4 is a schematic diagram explaining contact between a peeling body and a carrier film.

FIG. 6 shows test results including sheet resistance of a conductive function given layer on optical film side and releasable film side.

BEST MODE FOR IMPLEMENTING THE INVENTION

Figure 1:
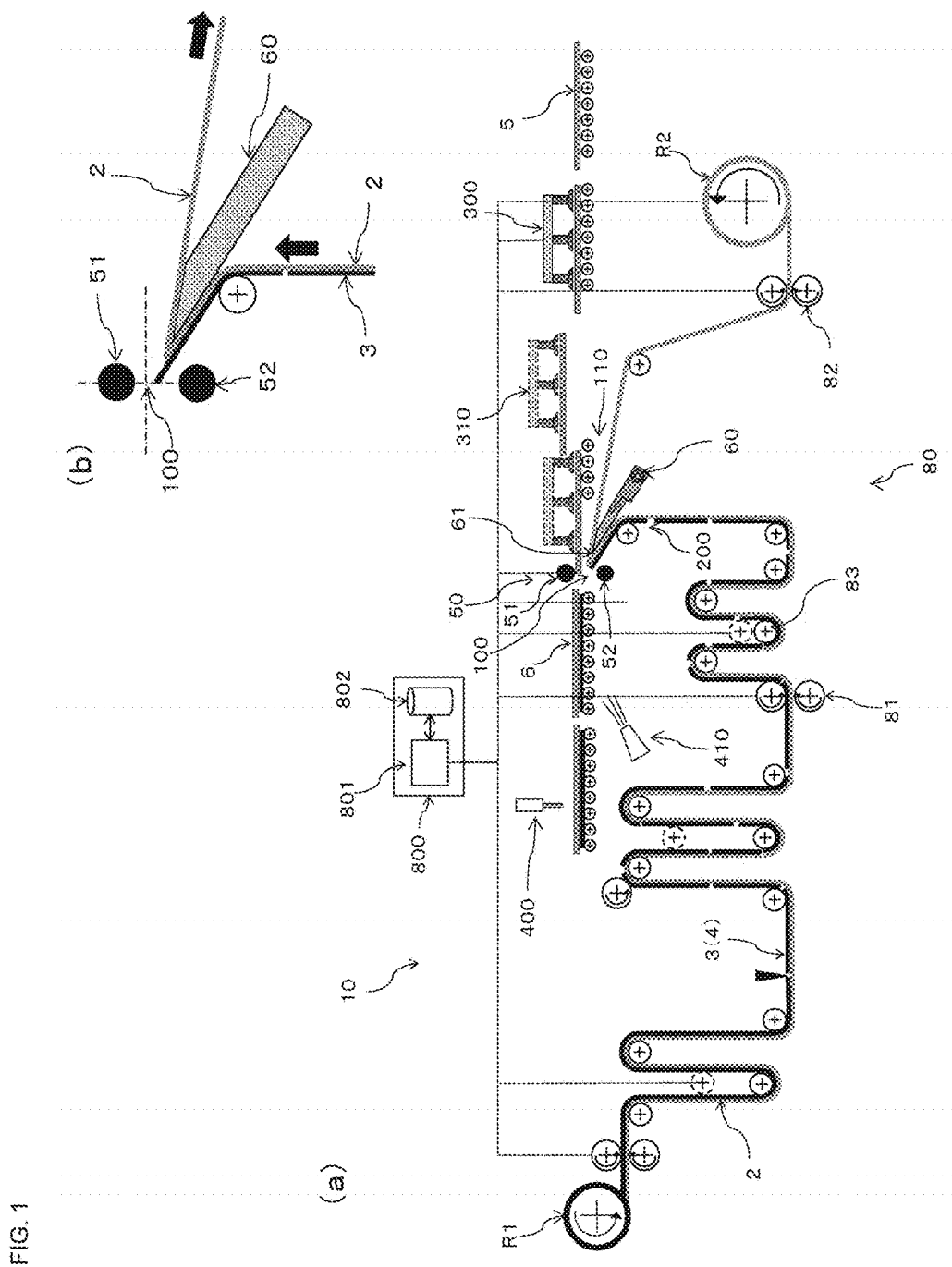
FIG. 1 is a schematic diagram showing an entire RTP lamination apparatus.

FIG. 1 (*a*) is a schematic diagram showing an entire RTP lamination apparatus. In the RTP lamination apparatus 10, a continuous web of optical film laminate 1 is wound on a feeding roller R1. The optical film laminate 1 comprises a carrier film 2 having a width corresponding at least to a size (a long side or a short side) of a panel component 5 and a plurality of optical film sheets 3 continuously supported on an adhesive layer 4 formed on one of surfaces of the carrier film 2. The optical film sheets 3 are formed on a film sheet including the adhesive layer 4 by forming slit lines reaching to a surface of the carrier film 2 in an optical film laminated via the adhesive layer 4 to the carrier film 2 with intervals corresponding to a size (a short side or a long side) of the panel component 5.

The RTP lamination apparatus 10 comprises a film feeding apparatus 80 consisting of up-stream rollers 81 for feeding the optical film laminate 1 from the feed roller R1 and down-stream rollers 82 for winding a continuous web of carrier film 2 peeled from the optical film laminate 1 on a winding roller R2. Such configuration allows for conveying the continuous web of optical film laminate 1 without slacking toward a predetermined lamination position 100, and peeling optical film sheets 3 including an adhesive layer 4 from the carrier film 2 of the continuous web of optical film laminate 1 by a peeling body 60 having a tip-end 61 arranged in vicinity of the predetermined lamination position 100. While peeling the optical film sheets 3, the continuous web of carrier film 2 is collected on the winding roller R2 via a conveying channel 110 for the continuous web of carrier film 2.

As shown for example in FIG. 1 (*b*), the peeling body 60 is rectangular having a width at least of the continuous web of optical film laminate 1 and a structure of wedge-shaped cross section with the tip-end 61 as a leading end may be assumed. Normally, the tip-end 61 configuring the leading end is arranged at a position in vicinity of the predetermined lamination position 100, and the peeling body 60 is arranged as sloped immediately below a conveying channel 310 of panel components 5. The conveying channel 110 of the continuous web of carrier film 2 which is turned back at the tip-end 61 is normally positioned as a double-storied structure with the conveying channel 310 of the panel components 5.

In the RTP lamination apparatus, the panel components 5 are conveyed to the predetermined lamination position, for example along the conveying channel 310 from a predetermined waiting position 300, as corresponding to the optical film sheets 3 including the adhesive layer 4 being conveyed to the predetermined lamination position 100. At the predetermined lamination position 100, a lamination apparatus 50 including a lamination roller 51 laminates the optical film sheets 3 to one of surfaces of the conveyed panel components 5 via the adhesive layer 4.

In manufacturing optical display device 6, since a panel component 5 configuring the optical display device 6 normally has electronic components such as Thin Film Transistor (TFT) built therein, static electrification prevention cannot be neglected in view of avoiding electrostatic discharge damage. As already described in Patent Document 5, prevention means for static electrification caused by peeling, i.e. for static electricity generated by peeling optical film sheets 3 including an adhesive layer 4 laminated to the panel components 5 from a carrier film 2, is only one example. As shown in a schematic diagram of FIG. 1, for example, static electrical charge generated by peeling from the carrier film 2 in the optical film sheets 3 including the adhesive layer 4 may be restricted and controlled by using a self-discharging static eliminator 400 and/or an ionizer 410, or using a continuous web of optical film laminate which has conductive function as disclosed in Patent Document 4.

Figure 2:
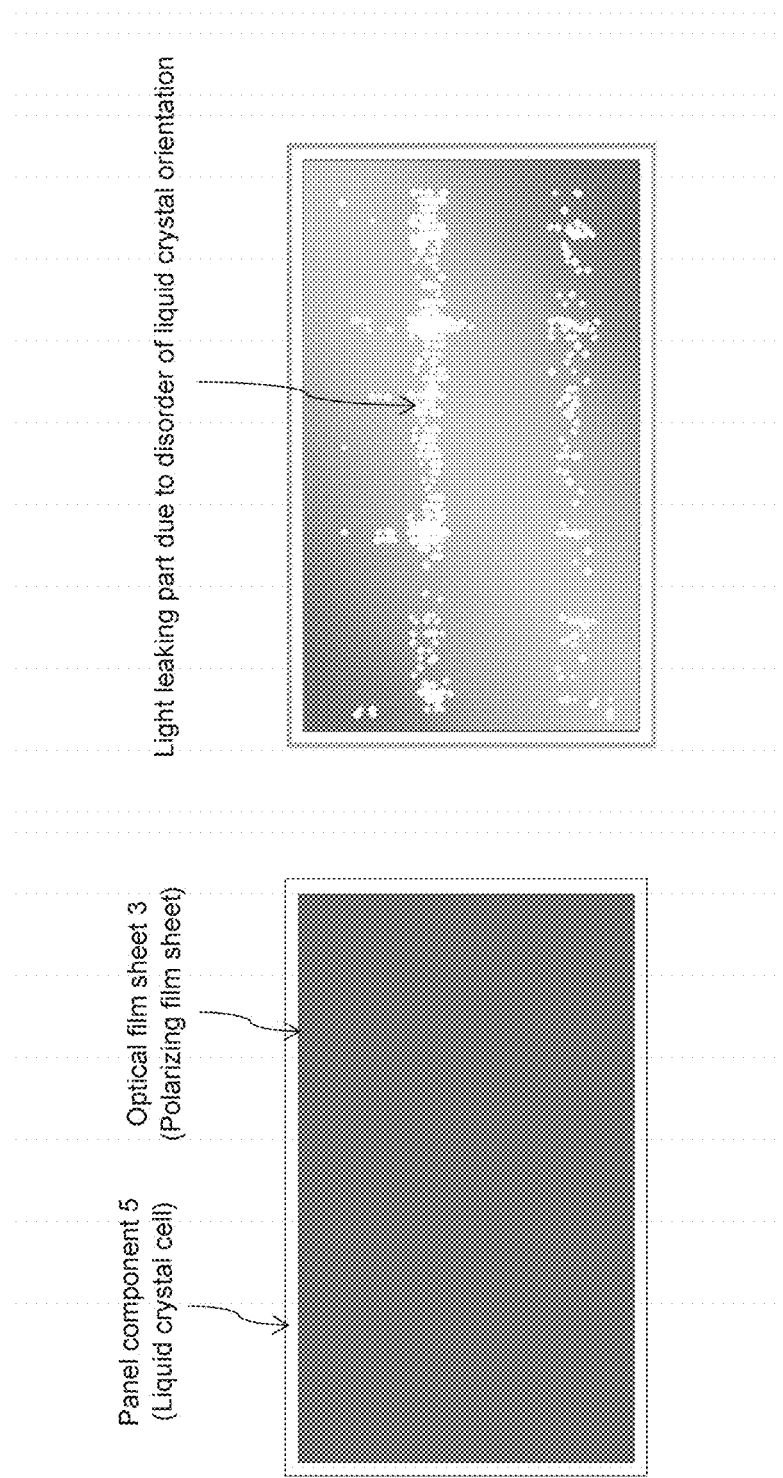
FIG. 2 is a photograph showing light leaking phenomenon of an optical display device (a liquid crystal panel).

Nevertheless, as seen in the photograph of FIG. 2, light leaking parts are created in the optical display device 6 due to orientation disorder of liquid crystal. As a result, transmission inspection of the optical display device 6 as a product becomes impossible and continuous manufacturing of the optical display device 6 is impaired.

When causes of the above are considered, it is found as that static electrification prevention by using the ionizer 410 in RTP lamination apparatus 10 is incomplete, because the statically electrified optical film sheets 3 are immediately laminated to the panel components 5 without sufficient static elimination after peeling from the carrier film 2. For a continuous web of optical film laminate which has conductive function, sheet resistance of a conductive layer should be $10^6$ Ω/sq or less, but such optical film laminate is too expensive when material cost is considered and is not realistic as a means for static electrification prevention.

The present invention has a feature that optical film sheets configuring a continuous web of optical film laminate and a conductive layer included in a carrier film are both formed on a peeling surface side and that static electrical charge generated by peeling may be surely attenuated even if sheet resistance is not reduced to $10^6$ Ω/sq or less. In that case, forming position of both conductive layer is important, as static electrification prevention function may not be exerted if the conductive layer is formed on a surface opposite to the peeling surface. Normally, it is preferable that an optical film laminate has a multi-layered structure in which a continuous web of protection film made from triacetylcellose (TAC) resin, acrylic resin or cyclo-olefin resin is laminated to at least one of surfaces of a continuous web of polarizer made from polyvinyl alcohol (PVA) resin, and that a releasable film is made from polyethylene terephthalate (PET) resin.

A continuous web of carrier film 2 is statically electrified by peeling from optical film sheets 3. The carrier film 2 statically electrified by peeling is conveyed to a winding roller R2 via a conveying channel 110 and collected. As seen in FIG. 1 (*a*) or (*b*), panel components 5 are, for example, conveyed toward a predetermined lamination position 100 along a conveying channel 310 in an opposite direction in vicinity of the carrier film 2 which is conveyed to be collected.

At that time, inductive electrification is caused in the panel components 5 by the carrier film 2 as being collected, which affects electronic components built in the panel components 5, and then light leaking parts are created in optical display device 6 which is manufactured by laminating the optical film sheets 3 to the panel components 5, as shown in FIG. 2. This not only makes it difficult to detect defects with transmission inspection of the optical display device 6 continuously manufactured by laminating the optical film sheets 3 to the panel components 5, but also may be a cause of electrostatic discharge damage of electronic components built in the panel components 5 before laminating the optical film sheets 3. In order to avoid such event, static electrical charge in a continuous web of carrier film 2 generated by peeling from optical film sheets 3 need to be controlled below a certain potential.

FIG. 4 (*a*) is a schematic diagram showing a state of static electrification when a continuous web of optical film laminate 1 is peeled by a peeling body 60 into optical film sheets 3 and a continuous web of carrier film 2. As shown in FIG. 4 (*a*), the optical film sheets 3 including an adhesive layer 4 are peeled from the carrier film 2, and, while statically electrified by peeling, are laminated to one of surfaces of the panel components 5 conveyed to a predetermined lamination position.

In the optical display device 6 manufactured under such state, inductive electrification is caused in the panel components 5 before reaching to the predetermined lamination position by the carrier film 2 statically electrified by peeling. Further, the optical film sheets 3 including the adhesive layer 4 are peeled from the carrier film 2 and, while being statically electrified by peeling, are laminated to one of surface of the panel components 5 conveyed to the predetermined lamination position 100. Either inductive electrification from the carrier film 2 or inductive electrification caused by laminating the statically electrified optical film sheets 3 including the adhesive layer 4 inevitably leads to a risk of deteriorating and electrostatically damaging electronic components built in the optical display device 6, which is considered as technically not avoidable.

Figure 3:
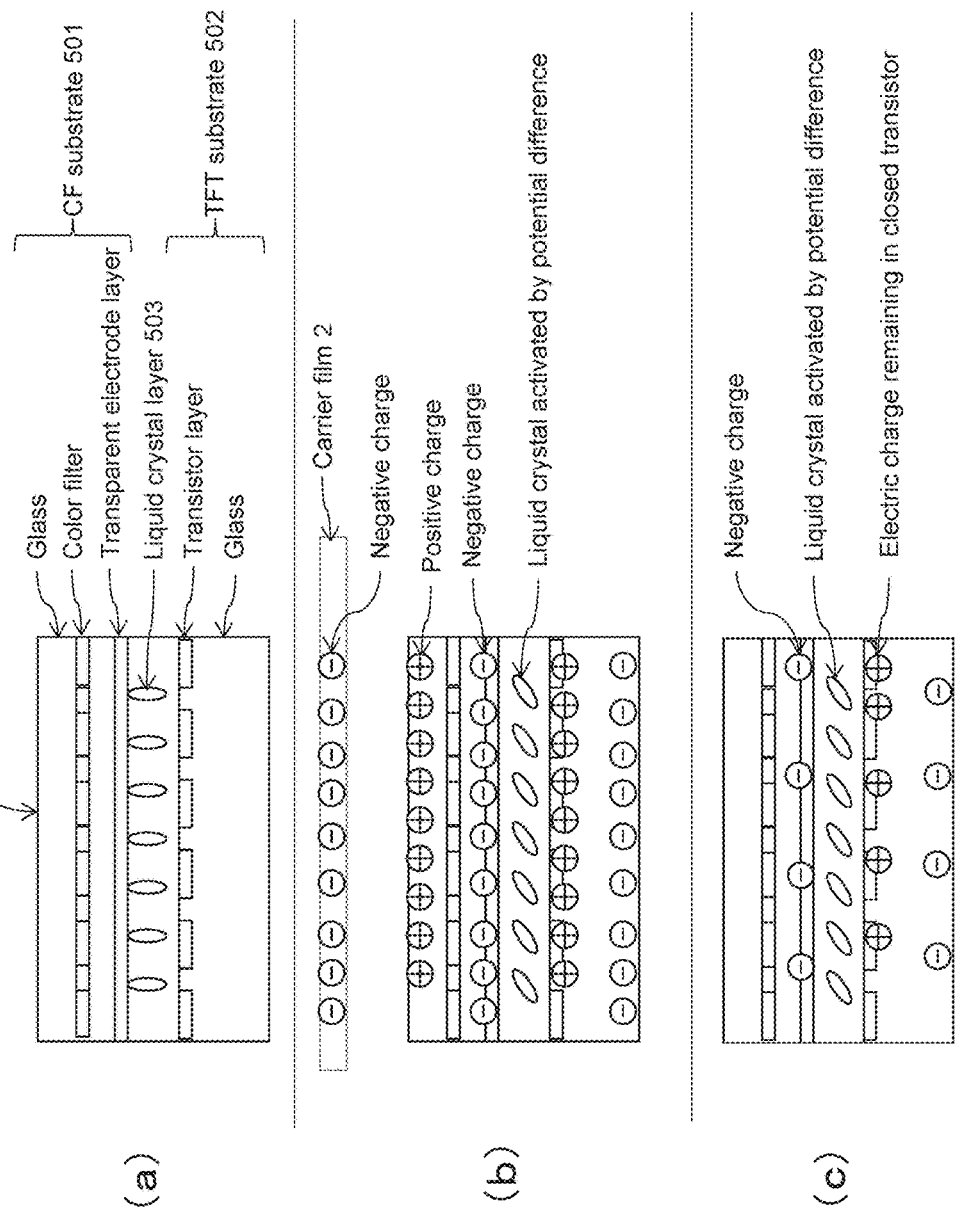
FIG. 3 is a schematic diagram showing orientation disorder of liquid crystal caused by inductive electrification of an optical display device (a liquid crystal panel).

For example, when a mechanism of orientation disorder of liquid crystal generated in an optical display device caused by inductive electrification as shown in FIG. 3 is considered for a case where the optical display device 6 is a liquid crystal panel, it is found as follows. That is, the panel components 5 shown in FIG. 3 (*a*) to (*c*) are objected for liquid crystal panels 5 in which a liquid crystal layer 503 is sealed in between a color filter substrate (CF substrate) 501 on viewing side and a TFT substrate 502 on non-viewing side. For example, as shown in FIG. 3 (*b*), in the panel components 5 which pass below a continuous web of carrier film 2 conveyed toward a predetermined lamination position 100 with negative charge generated by static electrification by peeling, static charge is polarized on both surfaces thereof due to inductive electrification.

More in particular, as seen in FIG. 3 (*b*), a surface of the CF substrate 501 closer to the carrier film 2 is positively charged and a bottom surface of the TFT substrate 502 is negatively charged. As a result, a bottom surface of the CF substrate 501 which forms a top surface of the liquid crystal layer 502 is negatively charged and a top surface of the TFT substrate 502 which forms a bottom surface of the liquid crystal layer 502 is positively charged, and then the liquid crystal layer 503 is activated by the potential difference. Since light passes where the liquid crystal layer 503 is activated, a surface of the panel components 5 looks like white-spotted.

Inductive electrification caused by laminating statically electrified optical film sheets 3 including an adhesive layer 4 may be explained as a same phenomenon. A problem is that, if the panel components 5 are statically charged over the upper limit of electrostatic charge, transistors in closed state are statically charged which takes time to attenuate while the liquid crystal layer 503 is continued to be activated due to potential difference, which in turn makes the white-spotted state shown in FIG. 2 continue. Thus, the technical problem to be solved by the present invention is to find a technical means to promptly attenuate static electrification of the panel components 5 so that the upper limit of electrostatic charge is not exceeded.

In RTP lamination device 10, it is difficult to provide that static electrification by peeling is not caused in a carrier film 2 peeled from a continuous web of optical film laminate 1. It is difficult to avoid a certain degree of inductive electrification in the panel components 5 because, normally, a conveying channel 110 for collecting a carrier film 2 which is statically electrified by peeling and a conveying channel 310 of panel components 5 are closely arranged. It is also difficult to avoid inductive electrification in the panel components 5 because optical film sheets 3 including an adhesive layer 4 which are statically electrified by peeling from a carrier film 2 are laminated to the panel components 5.

Figure 5:
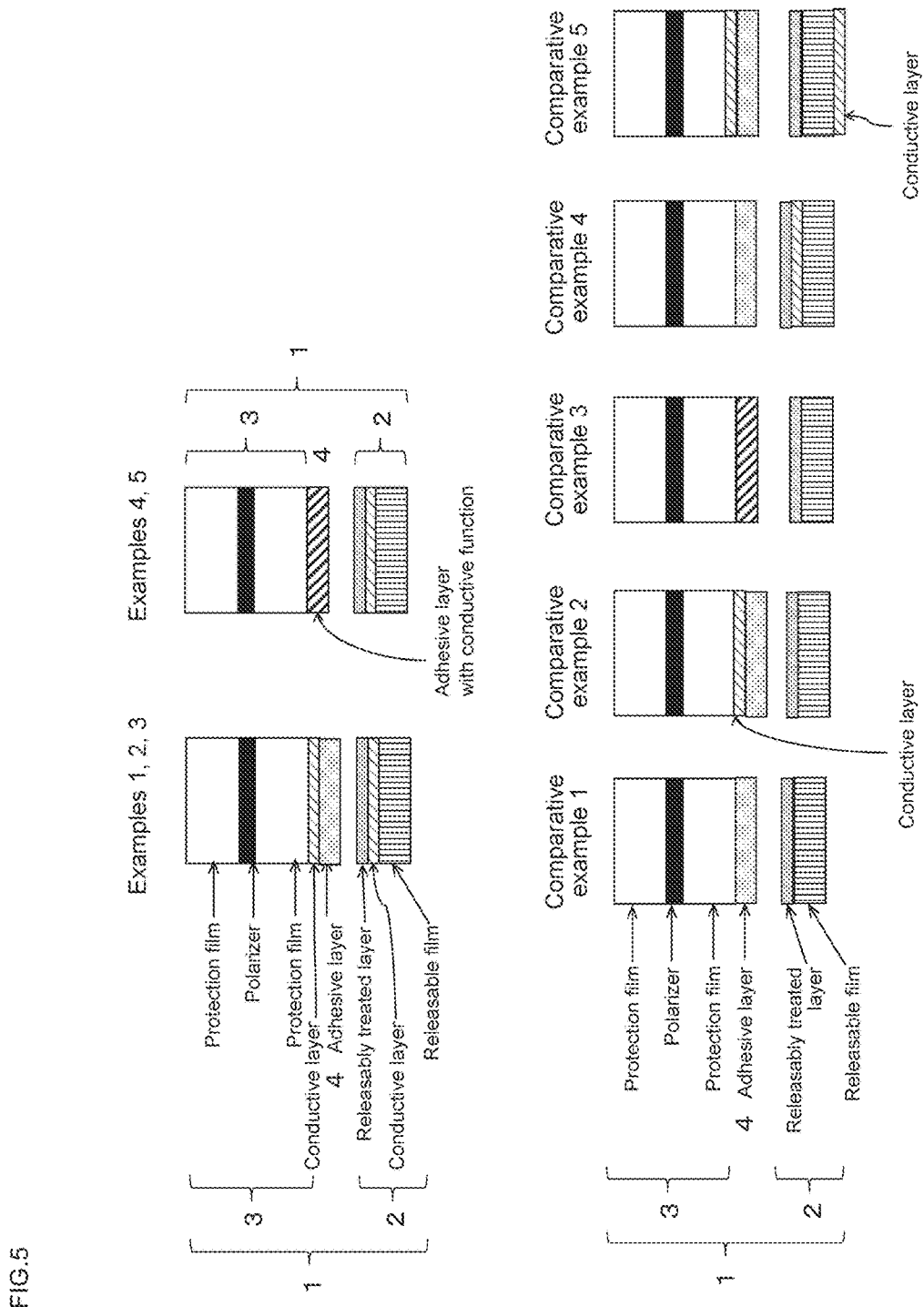
FIG. 5 shows structures of examples 1 to 5 and comparative examples 1 to 5 for testing.

As shown in FIG. 4 (*b*), the inventors of the present invention have created, in order to address those problems, a continuous web of optical film laminate 1 in which a carrier film 2 is provided with conductive function to so that static charge generated in the carrier film 2 by peeling is promptly attenuated, and further optical film sheets 3 including an adhesive layer 4 are provided with conductive function so that static charge generated in the optical film sheets 3 by peeling is promptly attenuated, and then have checked that light leakage in panel components 5 is not caused at what degree of upper limit of electrostatic charge i.e. allowable electrostatic charge for Examples 1 to 3 and Comparative Examples 1 and 2 shown in FIG. 5 in tests as follows.

Test for Example 1 consisted of: a first step of preparing, as an optical film, an optical film laminate (NPF-CMG1765CU) from Nitto Denko Corporation which has a structure as a conductive layer being formed on one of surfaces of a polarizing film and a releasable film being laminated via an adhesive layer on the conductive layer; a second step of peeling the releasable film from the prepared optical film laminate and forming an optical film laminate by laminating a releasable film with conductive function (MRF38CK(CT-EF)/38 μm PET film from Mitsubishi Plastics Inc.) to an adhesive layer side of the exposed optical film such that a conductive layer thereof is on the adhesive layer side; a third step of manufacturing a liquid crystal display device by peeling the releasable film from the optical film laminate and laminating the optical film including the adhesive layer to both surfaces of a panel component (a liquid crystal cell) taken out from a liquid crystal TV (49UB8300-CG) from LG Electronics; and a fourth step of placing the liquid crystal display device on a back light to visually check orientation disorder of liquid crystal.

Sheet resistance of an optical film with a conductive layer intervening between the optical film and an adhesive layer and sheet resistance of a releasable film with a conductive layer intervening between releasably treated layer to be peeled in the third step are both set at $10^{12}$ Ω/sq, and then, Examples without orientation disorder of liquid crystal and with orientation disorder which disappears within one minute are evaluated as ○, and those with orientation disorder of liquid crystal which takes more than 1 minute are evaluated as x. Example 1 was evaluated as ○ as shown in FIG. 6.

Comparative Example 1 to be compared with Example 1 was similarly evaluated through: a first step of preparing an optical film laminate in which a releasable film is formed in an adhesive layer, which does not have a conductive layer i.e. a static electrification prevention layer between a polarizing film and the adhesive layer; a second step of peeling the releasable film and forming an optical film laminate by laminating a releasable film (MRF38CK(CT-NS2)) without conductive function from Mitsubishi Plastics Inc. to the adhesive layer side of the polarizing film; and similar steps as for Example 1. Comparative Example 1 was not provided with a conductive layer on a side of the optical film including the adhesive layer to be peeled or on a side of the releasable film, and it was evaluated as x as shown in FIG. 6.

Comparative Example 2 was similarly evaluated through: a step of forming an optical film laminate by laminating a releasable film without conductive function as in Comparative Example 1 to an adhesive layer side of an optical film after peeling a releasable film from an optical film laminate from Nitto Denko Corporation with a structure as a releasable film is laminated via an adhesive layer to an optical film having a conductive layer as in Example 1, i.e. an optical film with sheet resistance of $10^{12}$ Ω/sq in which a conductive layer is intervened between the optical film and an adhesive layer, and similar steps as for Example 1. Optical film of Comparative Example 2 to be laminated to both surfaces of a liquid crystal cell has a conductive layer, but a releasable film to be peeled is not provided with conductive function, and it was evaluated as x, as shown in FIG. 6, similar as for Comparative Example 1.

Example 2 was formed with a method of the example 2 described in Patent Document 6 as an optical film, and was different from Example 1 only in that Example 2 uses an optical film having a conductive layer with sheet resistance set at $10^8$ Ω/sq which was intervened between a polarizing film and an adhesive layer. Sheet resistance of a releasable film to be peeled in the third step was set at $10^{12}$ Ω/sq, and Example 2 was tested through similar steps as for Example 1 and was evaluated as ○ as shown in FIG. 6, similar as for Example 1.

Example 3 is an optical film prepared such that values of sheet resistance on the optical film side and that on a releasable film side are reversed from those in Example 2. More in particular, an optical film laminate was formed by laminating a releasable film, formed by appropriately mixing curing silicon resin (KS847H from Shin-Etsu Chemicals Co., Ltd.) and polythiophene-containing conductive polymer resin (AS-D09E from Shin-Etsu Polymer Co., Ltd.) such that sheet resistance thereof is $10^8$ Ω/sq with a method disclosed in the example 1 described in Patent Document 7, to an adhesive layer side of an optical film with a conductive layer with sheet resistance set at $10^{12}$ Ω/sq as in Example 1 between a polarizing film and an adhesive layer, and Example 3 was similarly evaluated as Example 1. Result was ○ as shown in FIG. 6.

Further, as shown in FIG. 5, examples 4 or 5, and comparative examples 3 to 5 are tested to check that light leakage in panel components 5 is not caused at what degree of upper limit of electrostatic charge i.e. allowable electrostatic charge. Examples 4 or 5 consisting of an optical film having an adhesive layer with conductive function formed thereon and comparative examples 3 to 5 to be compared with the examples 4 or 5 were evaluated similarly as described in the above.

Example 4 was an optical film laminate formed by, as an optical film, laminating a releasable film formed in Example 3 i.e. a releasable film formed by appropriately mixing curing silicon resin (KS847H from Shin-Etsu Chemicals Co., Ltd.) and polythiophene-containing conductive polymer resin (AS-D09E from Shin-Etsu Polymer Co., Ltd.) such that sheet resistance thereof is $10^8$ Ω/sq with a method disclosed in the example 1 described in Patent Document 7 to a polarizing film with sheet resistance of $10^8$ Ω/sq which has an adhesive layer with conductive function formed on one surface thereof by appropriately adjusting volume of triethylsulfonium bis(trifluoromethanesulfonyl)imide (from Tokyo Chemical Industry Co., Ltd.) with a method of the example 14 described in Patent Document 2, and Example 4 was similarly evaluated as Example 1. Result was ○ as shown in FIG. 6.

Comparative example 3 to be compared with the example 4 was an optical film laminate formed by laminating a releasable film similar to one in the comparative example 3 i.e. a releasable film (MRF38CK(CT-NS2)) without conductive function from Mitsubishi Plastics Inc. to an optical film similar to one in the example 4 i.e. a polarizing film with sheet resistance of $10^8$ Ω/sq which has an adhesive layer with conductive function to one of surfaces of one of protection films, and Example 4 was similarly evaluated as Example 1. Result was x, as shown in FIG. 6, similar as for Comparative Example 1 or 2.

Comparative Example 4 was an optical film similar to one in Comparative Example 1 i.e. an optical film laminate formed by laminating a releasable film, formed by appropriately mixing curing silicon resin (KS847H from Shin-Etsu Chemicals Co., Ltd.) and polythiophene-containing conductive polymer resin (AS-D09E from Shin-Etsu Polymer Co., Ltd.) such that sheet resistance thereof is $10^8$ Ω/sq with a method disclosed in the example 1 described in Patent Document 7, to an adhesive layer formed on a polarizing film without a conductive layer between the polarizing film and the adhesive layer, and Comparative Example 4 was similarly evaluated as Example 1. Result was x, as shown in FIG. 6, similar as for Comparative Example 1, 2 or 3.

Example 5 was an optical film laminate formed by laminating a releasable film formed such that sheet resistance thereof is $10^{12}$ Ω/sq as in Example 1 to a polarizing film formed with a similar method as in Example 4 i.e. a polarizing film with sheet resistance of $10^{12}$ Ω/sq which has an adhesive layer with conductive function formed on one surface thereof by appropriately adjusting volume of triethylsulfonium bis(trifluoromethanesulfonyl)imide (from Tokyo Chemical Industry Co., Ltd.) with a method of the example 14 described in Patent Document 2, and Example 5 was similarly evaluated as Example 1. Result was ○ as shown in FIG. 6, similar as for Example 1 to 4.

Comparative Example 5 to be compared with Example 1 to 5 was an optical film laminate formed by laminating a releasable film formed by coating curing silicon resin (KS847H from Shin-Etsu Chemicals Co., Ltd.) to a surface contacting with an adhesive layer of the releasable film and coating polythiophene-containing conductive polymer resin (AS-D09E from Shin-Etsu Polymer Co., Ltd.) to a surface opposite to the surface contacting with the adhesive layer of the releasable film such that sheet resistance thereof is $10^8$ Ω/sq with a method disclosed in Paragraph [0130] of Patent Document 7 to an optical film having a similar conductive layer as in Example 1 i.e. an adhesive layer side of an optical film in which a releasable film is peeled from a polarizing film from Nitto Denko Corporation with a structure as that a conductive layer is formed on one of surfaces of a polarizing film such that sheet resistance thereof is $10^{12}$ Ω/sq and a releasable film is laminated via an adhesive layer on the conductive layer, and Comparative Example 5 was similarly evaluated as Example 1. Result was x, as shown in FIG. 6, similar as for Comparative Example 1 to 4.

By the way, as shown in FIG. 1, although the present invention has been presented by using RTP lamination apparatus having a peeling body 60 with a structure of wedge-shaped cross section assumed therefor being arranged in vicinity of a predetermined lamination position 100, it is obvious that RTP lamination apparatus is not limited as such.

Figure 7:
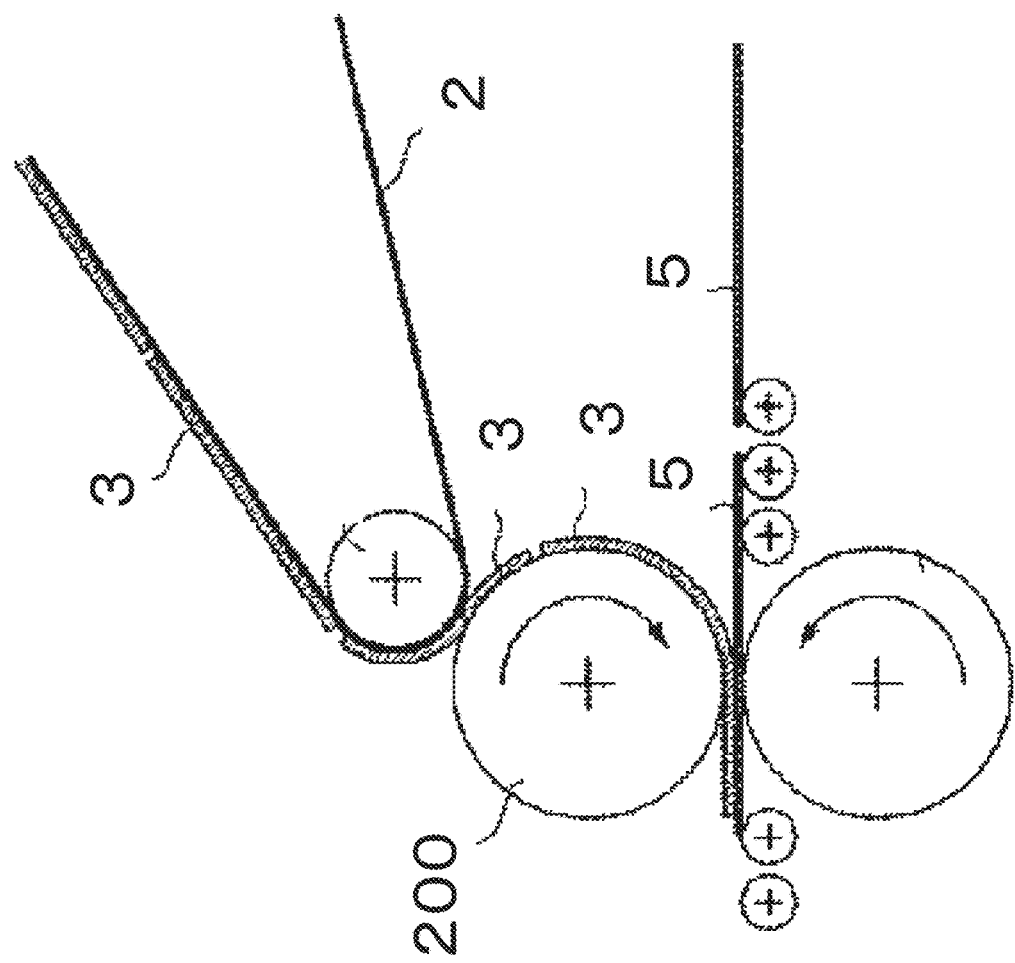
FIG. 7 is a diagram showing RTP lamination apparatus using lamination drums of vacuum-suction structure.

For example, RTP lamination apparatus using lamination drums with vacuum suction structure shown in FIG. 7 may be envisaged. In such RTP lamination apparatus, optical film sheets 3 are peeled from a peeling member, and a surface of the optical film sheets 3 opposite to a surface which an adhesive layer formed thereon is absorbed to lamination drums 200 by vacuum suction. As such, the optical film sheets 3 are rolled to the lamination drums 200 and conveyed to a predetermined lamination position so as to overlap with panel components 5, where the optical film sheets 3 are laminated such that the surface which the adhesive layer being formed thereon is pressed against the panel components 5.

Although the present invention has been described for preferable embodiments, those skilled in the art may understand that various modifications may be made and elements may be replaced with equivalents without departing the scope of the present invention. Therefore, the present invention should not be limited to specific embodiments disclosed as the best mode of embodiments considered for implementing the present invention, and it is intended that the present invention encompasses all embodiments which belong to claims.

EXPLANATION OF NUMERICAL CHARACTERS

1: Optical film laminate
2: Carrier film
3: Optical film or Optical film sheet
4: Adhesive layer
5: Panel component
6: Optical display device
10: RTP apparatus
50: Lamination apparatus
60: Peeling body 100: Predetermined lamination position
110: Conveying channel of carrier film
310: Conveying channel of panel component
400: Self-discharging static eliminator
410: Ionizer
501: CF substrate
502: TFT substrate
503: Liquid crystal layer

The invention claimed is:

1. A continuous web of optical film laminate for using in continuous lamination to panel components, in which the panel components are conveyed in close vicinity of a continuous web of releasable film released from the continuous web of optical film laminate, the continuous web of optical film laminate comprising:
 a continuous web of optical film in which an adhesive layer is formed on one surface thereof to be laminated at least to the panel components; and
 the continuous web of releasable film in which a releasably treated layer is formed on a surface contacting with the adhesive layer, wherein a continuous web of a first conductive layer is intervened between the optical film and the adhesive layer and a continuous web of a second conductive layer is intervened between the releasable film and the releasably treated layer,
 wherein the first conductive layer is not a panel electrode and the first conductive layer and the second conductive layer are formed with a material which provides static electrification prevention function, such that the optical film with the first conductive layer intervening between the optical film and the adhesive layer, and the releasable film with the second conductive layer intervening between the releasable film and the releasably treated layer, both have a sheet resistance as high as $10^{12}$ Ω/sq.

2. The continuous web of optical film laminate as defined in claim 1, characterized in that, the material which provides static electrification prevention function is one of ionic surface-active agent including cationic or anionic agent, conductive polymer, or metal oxide including tin oxide or antimony oxide.

3. A wound roll comprising a continuous web of optical film laminate as defined in claim 1.

4. A feeding roll for RTP lamination apparatus, characterized in that, the feeding roll is formed by slitting and winding the wound roll defined in claim 3 to a width corresponding to a long side or a short side of panel components to be used for RTP lamination apparatus.

5. A continuous web of optical film laminate for using in continuous lamination to panel components, in which the panel components are conveyed in close vicinity of a continuous web of releasable film released from the continuous web of optical film laminate, the continuous web of optical film laminate comprising:
 a continuous web of optical film in which an adhesive layer is formed on one surface thereof to be laminated at least to the panel components; and
 the continuous web of releasable film in which a releasably treated layer is formed on a surface contacting with the adhesive layer, wherein the optical film is intervened with a continuous web of a conductive layer between the optical film and the adhesive layer, and the releasable film is provided with conductive function on the releasably treated layer side,
 wherein the conductive layer is not a panel electrode, and is formed with a material which provides static electrification prevention function, such that the optical film with the conductive layer intervening between the optical film and the adhesive layer, and the releasable film provided with the conductive function, both have a sheet resistance as high as $10^{12}$ Ω/sq.

6. The continuous web of optical film laminate as defined in claim 5, characterized in that, the material which provides static electrification prevention function is one of ionic surface-active agent including cationic or anionic agent, conductive polymer, or metal oxide including tin oxide or antimony oxide.

7. The continuous web of optical film laminate as defined in claim 5, characterized in that, the releasable film is a polyethylene terephthalate (PET) resin film including a material which provides static electrification prevention function.

8. The continuous web of optical film laminate as defined in claim 7, characterized in that, the material which provides static electrification prevention function is one of ionic surface-active agent including cationic or anionic agent, conductive polymer, or metal oxide including tin oxide or antimony oxide.

9. A wound roll comprising a continuous web of optical film laminate as defined in claim 5.

10. A feeding roll for RTP lamination apparatus, characterized in that, the feeding roll is formed by slitting and winding the wound roll defined in claim 9 to a width corresponding to a long side or a short side of panel components to be used for RTP lamination apparatus.

11. A continuous web of optical film laminate for using in continuous lamination to panel components, in which the panel components are conveyed in close vicinity of a continuous web of releasable film released from the continuous web of optical film laminate, the continuous web of optical film laminate comprising:
 a continuous web of optical film with a continuous web of a conductive adhesive layer formed on one surface thereof to be laminated at least to the panel components; and
 the continuous web of releasable film with a releasably treated layer formed on a surface contacting with the conductive adhesive layer, wherein the releasable film is intervened with a continuous web of a conductive layer between the releasable film and the releasably treated layer,
 wherein the conductive adhesive layer is not a panel electrode, and includes a material which provides static electrification prevention function, such that the optical film including the conductive adhesive layer, and the releasable film including the conductive layer, both have a sheet resistance as high as $10^{12}$ Ω/sq.

12. The continuous web of optical film laminate as defined in claim 11, characterized in that, the conductive adhesive layer is an acrylic adhesive layer including the material which provides static electrification prevention function.

13. The continuous web of optical film laminate as defined in claim 12, characterized in that, the material which provides static electrification prevention function is one of ionic surface-active agent including cationic or anionic agent, conductive polymer, or metal oxide including tin oxide or antimony oxide.

14. The continuous web of optical film laminate as defined in claim 11, characterized in that, the conductive layer is formed with a material which provides static electrification prevention function.

15. The continuous web of optical film laminate as defined in claim 14, characterized in that, the material which provides static electrification prevention function is one of ionic surface-active agent including cationic or anionic agent, conductive polymer, or metal oxide including tin oxide or antimony oxide.

16. A wound roll comprising a continuous web of optical film laminate as defined in claim 11.

17. A feeding roll for RTP lamination apparatus, characterized in that, the feeding roll is formed by slitting and winding the wound roll defined in claim 16 to a width corresponding to a long side or a short side of panel components to be used for RTP lamination apparatus.

18. A continuous web of optical film laminate for using in continuous lamination to panel components, in which the panel components are conveyed in close vicinity of a continuous web of releasable film released from the continuous web of optical film laminate, the continuous web of optical film laminate comprising:

a continuous web of optical film with a continuous web of a conductive adhesive layer formed on one surface thereof to be laminated at least to the panel components; and the continuous web of releasable film with a releasably treated layer formed on a surface contacting with the conductive adhesive layer, wherein the releasable film is provided with conductive function on the releasably treated layer side, wherein the conductive adhesive layer is not a panel electrode, and includes a material which provides static electrification prevention function, such that the optical film including the conductive adhesive layer, and the releasable film provided with the conductive function, both have a sheet resistance as high as $10^{12}$ Ω/sq.

19. The continuous web of optical film laminate as defined in claim 18, characterized in that, the conductive adhesive layer is an acrylic adhesive layer including the material which provides static electrification prevention function.

20. The continuous web of optical film laminate as defined in claim 19, characterized in that, the material which provides static electrification prevention function is one of ionic surface-active agent including cationic or anionic agent, conductive polymer, or metal oxide including tin oxide or antimony oxide.

21. The continuous web of optical film laminate as defined in claim 18, wherein the releasable film is a polyethylene terephthalate (PET) resin film including a material which provides static electrification prevention function.

22. The continuous web of optical film laminate as defined in claim 21, characterized in that, the material which provides static electrification prevention function is one of ionic surface-active agent including cationic or anionic agent, conductive polymer, or metal oxide including tin oxide or antimony oxide.

23. A wound roll comprising a continuous web of optical film laminate as defined in claim 18.

24. A feeding roll for RTP lamination apparatus, characterized in that, the feeding roll is formed by slitting and winding the wound roll defined in claim 23 to a width corresponding to a long side or a short side of panel components to be used for RTP lamination apparatus.

* * * * *